June 30, 1925.  1,544,302
S. I. FEKETE ET AL
BRAKE OPERATING MEANS FOR AUTOMOBILES
Filed Aug. 2, 1923
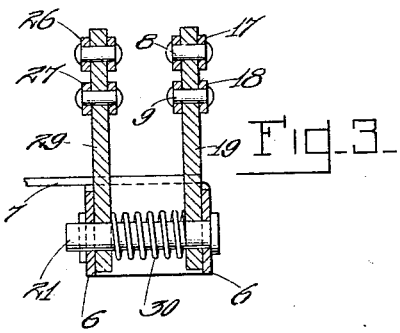
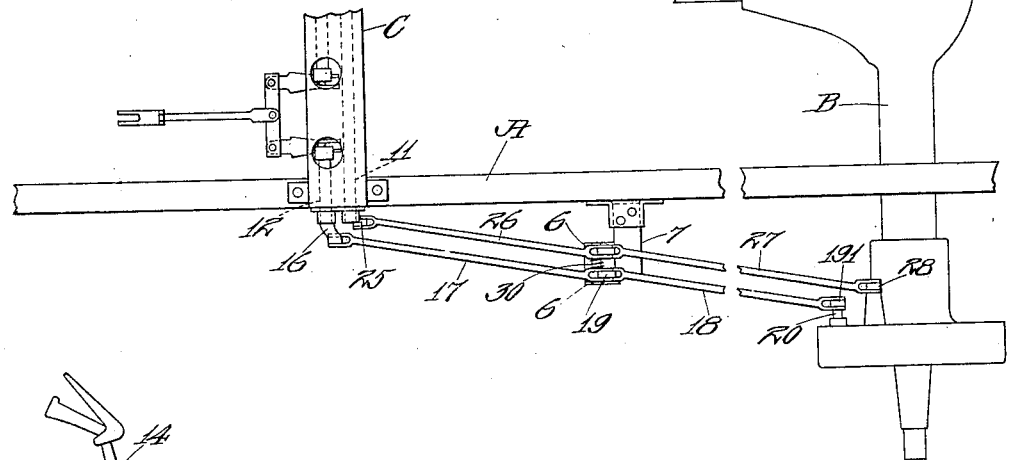
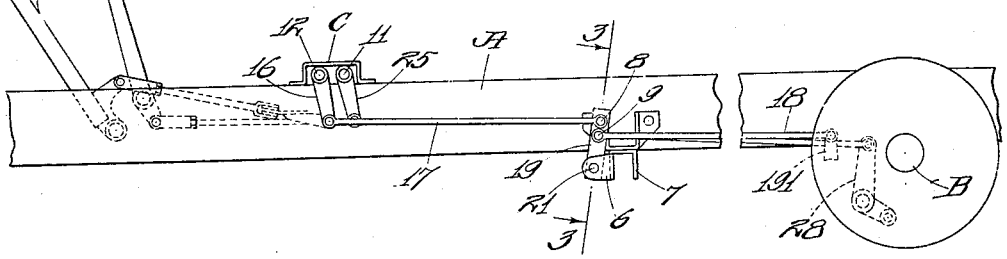
INVENTORS:
Stephen I. Fekete and
Millard H. Toneray
by Macleod, Calm, Copeland
Attys Patented June 30, 1925.

1,544,302

UNITED STATES PATENT OFFICE.

STEPHEN I. FEKETE AND MILLARD H. TONCRAY, OF DETROIT, MICHIGAN, ASSIGNORS TO HUDSON MOTOR CAR COMPANY, OF DETROIT, MICHIGAN, A CORPORATION OF MICHIGAN.

BRAKE-OPERATING MEANS FOR AUTOMOBILES.

Application filed August 2, 1923. Serial No. 655,263.

*To all whom it may concern:*

Be it known that we, STEPHEN I. FEKETE and MILLARD H. TONCRAY, citizens of the United States, residing at Detroit, county of Wayne and State of Michigan, have invented a certain new and useful Improvement in Brake-Operating Means for Automobiles, of which the following is a specification, reference being had therein to the accompanying drawings.

Our invention relates to brake operating mechanism for motor vehicles and has for its object mechanism which will be more satisfactory in use than the constructions now commonly employed.

The invention will be fully understood from the following description when taken in connection with the accompanying drawings and the novel features thereof will be pointed out and clearly defined in the claim at the close of this specification.

In the drawings, Fig. 1 is a top plan view of a brake-operating mechanism embodying my invention, portions of the chassis frame and rear axle being also shown.

Fig. 2 is a side elevation of the parts shown in Fig. 1.

Fig. 3 is a section on line 3—3 Fig. 2.

Referring now to the drawings, the chassis frame is indicated at A, the rear axle at B and one cross member of the chassis frame at C. At 11 and 12 are shown rock shafts located in the cross member C. These rock shafts are rotated by the hand brake lever 14 and foot pedal 15 respectively, there being intermediate linkage of any suitable character not necessary to be described in detail. The rock shaft 12 has a depending arm 16 to which is connected a brake rod or other suitable tension member 17 which is substantially in line with another brake rod or suitable tension member 18, the rear end of which is connected to the arm 19 on a rock shaft 20, carried on a fixed part of the rear axle B. Between the proximate ends of the two brake rods or tension members 17 and 18 is located a lever 19 which is pivoted to a pin 21 supported by a pair of lugs 6 on a bracket 7 carried by the frame or by other suitable fixed support. The rear end of the rod 17 is pivoted at 8 to the lever 19 and the front end of the rod 18 is also pivoted at 9 to the lever 19 but at a point between the pivot 8 and pin 21.

Likewise the rock shaft 11 is provided with a downwardly depending arm 25 to which is connected a rod 26 which is substantially in line with another rod 27, the rear of which is connected to an arm 28 mounted on the housing of the rear axle B. On the pivot pin 21 there is a second lever 29 and the rear end of the rod 26 and the front end of the rod 27 are pivoted to this lever in the same way as the rods 17 and 18 are connected to the lever 19. Between the two levers 19 and 29 and surrounding the pivot pin 21 is a spring 30 which presses the levers 19 and 29 against the lugs 6 and thereby prevents any rattling which otherwise might be caused by side play of the levers 19 and 29.

The levers 19 and 29 perform two functions, first, they act as mechanism by which the amount of movement imparted by the arms 16 and 25 to the arms 191 and 28 respectively is varied being in the forms shown in the drawings reduced, and in the second place they support and aline the brake rods so that they will not rattle or vibrate on rough roads.

What we claim is:

The brake operating means for motor vehicles comprising two pair of brake rods, the two rods of each pair being substantially in line with each other, and the two pairs being side by side, a pair of levers, lugs on a fixed part of the vehicles, a pivot pin passing through said lugs and said levers, and a spring holding the levers yieldingly against said lugs, the proximate ends of each pair of rods being connected to one of said levers.

In testimony whereof we affix our signatures.

STEPHEN I. FEKETE.
MILLARD H. TONCRAY.